United States Patent Office 3,121,028
Patented Feb. 11, 1964

3,121,028
HIGH PERFORMANCE BATTERY
Joseph B. Story, Baton Rouge, La., assignor to Ethyl Corporation, New York, N.Y., a corporation of Virginia
No Drawing. Filed June 29, 1959, Ser. No. 823,308
5 Claims. (Cl. 136—6)

This invention relates to high performance voltaic cells or batteries. In particular, it relates to a new and improved type of voltaic cell employing a novel depolarizing system.

Batteries, or voltaic cells, have been used for a variety of purposes for many years. Generally, their use is greatly limited because of their low energy output per unit weight. Most of the weight of batteries is to be found associated either with the cathode reactants or with the structural requirements of the battery. The weight of the cathode reactants is of most importance in primary cells. These materials are usually the oxides or peroxides of metals, e.g., manganese, copper, silver, lead, mercury, vanadium, etc., and are even heavier than zinc metal which is commonly used as an anode reactant. Many of these materials are porous and also hold a large amount of electrolyte which adds to the weight. In some cells large amounts of electrolyte are required because of the necessity to supply dilute electrode reactants. Because of the nature of the cathode reactants it is also necessary that the container also be made of heavy materials. Thus, elaborate mechanical supports are provided to hold relatively small amounts of active materials in close proximity.

A great need presently exists for the development of high performance, viz., high energy and high power, electrochemical sources. By the "energy" requirement is meant the quantity of electrical energy that must be supplied, and by a "power" requirement is meant the rate at which the energy must be delivered without regard to the total available energy. Any actual battery requires both demands, the relative importances of the two depending upon the particular use. An example of the former is a battery for the operation of a low power satellite radio transmitter for an extended period; and the latter, a battery for use as an auxiliary power source as in a missile or rocket.

Accordingly it is an object of the present invention to provide batteries having energetic electrochemical reactions capable of meeting higher energy and high power demands and of meeting a brand range of intermediate uses. More specifically, it is an object to provide a cell utilizing sulfur or a sulfur compound depolarizer which provides an adequately energetic reaction and does not require the special structures employed in former cells. The depolarizer also can be easily and conveniently produced in a number of presently existing cell and battery structures with great economy. It is also an object of the invention to provide a cell or battery having a low internal electrical resistance which can conveniently supply a large power demand. Also, an object is to provide aqueous systems possessing a combination of properties which make them suitable for either energy or power cells, and for either primary or storage cells.

These and other objects of the invention will be clearly understood from the following general description of the invention.

This invention involves the formation of voltaic cells by dividing same into at least an anode compartment and a cathode compartment, the said compartments containing an inorganic sulfur depolarizing agent in different oxidation states. By forming an external circuit between anode and cathode an electric current, resulting from the electrochemical reaction between the depolarizing substances, can be withdrawn upon demand.

More specifically the invention is an electrochemical cell for the production of an electrical current comprising a cell separated by a permeable diaphragm member to form an anode compartment and a cathode compartment, each of said compartments having an electrode in contact with an aqueous solution of a sulfur depolarizing agent at a different oxidizing potential, said sulfur depolarizing agent being sulfur or an inorganic sulfur compound. Preferably, such sulfur compounds are those having polyvalent forms of sulfur because generally greater electro-chemical energy is liberated therefrom. All inorganic sulfur compounds or sulfur depolarizing agents can be employed if soluble in and not hydrolyzed too rapidly by water or aqueous solutions. The solution can be made basic if desirable, as to dissolve sulfur.

Examples of suitable sulfur depolarizing agents are elemental sulfur, the sulfides and polysulfides, i.e., sodium polysulfide, hydrogen polysulfide, hydrogen pentasulfide, sodium sulfide, hydrogen sulfide, etc.; oxygenated sulfur compounds, i.e., sulfoxylic acid, sulfur dioxide, sulfur trioxide, etc.; the sulfites and disulfites, sodium sulfite, sodium disulfite, etc.; the sulfates, thiosulfates, persulfates, sodium pyrosulfate, sodium peroxydisulfate, etc.; the halogenated compounds of sulfur such as sulfur monobromide, sulfur hexafluoride, iodine disulfide, sulfur subiodide, etc.; sulfoxylic acid salts and polythionates, sodium dithionate, sodium hexathionate, etc.; the oxyhalides such as sulfur monooxytetrachloride, pyrosulfuryl chloride, sulfuryl fluoride, thionyl bromide, etc.

The sulfur compounds described above provide high ampere hour capacity and can be contained in a package of small weight, due to the low weight of such compounds and because of the low weight electrodes employed.

Preferred electrodes are those made of carbon having a high specific surface made of several varieties of graphite, carbon black, lamp black, active carbon or a mixture containing these substances. Its function is to adsorb the reacting ingredients at the surface to provide an extended surface area wherein reaction can take place.

The surface active area is further greatly extended by the use of an asbestos-graphite mixture or paste within which the aqueous solution of the sulfur depolarizer is mixed. By this technique, the effective electrode area is extended through the contiguous graphite coated asbestos fibers and thus provide an extremely large surface active area. Thus the electrodes are extended and are separated by only the thickness of the diaphragm employed. By using suitably thin layers of electrode material, the internal resistance of the battery is kept extremely low thus facilitating high power applications.

The requisites for the diaphragms employed in these cells are that they be non-conducting, porous and inert within the particular system employed. Examples of such materials include paper, cotton, asbestos, starch paste, etc. When a system is employed which is incompatible with these materials, others may be used. For example, when using a strongly alkaline system a ceramic material can be employed. It is also possible to employ semi-permeable materials for special purposes. Generally such materials need be no thicker than about 0.04 of an inch. Preferably, the diaphragm material is no thicker than about 0.01 inch.

The following examples illustrate the present invention but should not be construed as in any way limiting same. All parts are given in weight units unless otherwise specified.

WORKING EXAMPLES

The apparatus or cell employed in the following examples, Examples I through IV, was as follows: A dry mixture of 3 parts brilliant asbestos fiber to 10 parts medium powdered flake graphite was prepared. This material was made into a thick paste by adding the particular aqueous sulfur-containing depolarizing substance to constitute the active material. The container employed was a 50 milliliter glass beaker within which was vertically placed, open end upward, a porous paper Soxhlet extraction thimble (12 mm. diameter) to serve as the diaphragm. A portion of the active paste was packed outside the thimble and a portion therein. Two lengths of spectroscopic carbon rods were used as electrodes, one was immersed inside and the other outside the depolarizing material of the thimble. An internal circuit provided with a key to open and close the circuit, was then formed between the electrodes. The voltage of the cell was then measured with a voltmeter and the amperage with an ammeter under conditions in which the internal resistance of the cell, including polarization, was controlling.

In the examples immediately following, i.e., Examples I through IV, the active material initially charged into the anode and cathode compartments was of identical material. An external voltage was applied to the anode and cathode in these cases however, to produce sulfur compounds having different oxidation potentials in each of the compartments. In other words, intermediate valence sulfur compounds were initially charged into the anode and cathode compartments and then electrolyzed to give more extreme valences. It is seen then that these systems behave as secondary cells.

In the example immediately following, the depolarizing material contains sodium thiosulfate as the active material prior to charging.

*Example I*

The active paste charged into the electrode compartments contained an aqueous saturated sodium thiosulfate solution. An external voltage, 2 volts, was applied to the electrodes to convert the active material into a cathode reactant and electrolyte. The cell was so charged for 25 minutes. After the charge had been impressed upon the cell it was found that the cell registered 1 volt upon the voltmeter and was capable of supplying a 60 milliampere current within the external circuit.

After standing overnight the battery was recharged in the same manner. It again registered 1 volt on the voltmeter and produced a 120 milliampere current within the external circuit.

In the following example hydrogen sulfide and sulfur dioxide are employed as the active depolarizing ingredient.

*Example II*

In this example the active paste was formed with a saturated aqueous solution containing the reaction products of hydrogen sulfide and sulfur dioxide. The exact conditions of the foregoing example were repeated and in this case it was found that a 0.5 volt cell was produced. A 20 milliampere current was produced within the external circuit.

By doubling the voltage applied to the cell to form the extreme valence compounds, i.e., by applying 4 volts, the voltage of the cell was increased to 1.13. A 50 milliampere current was then produced within the external circuit.

In the following example the active ingredient of the depolarizing material was sulfur contained in a strongly alkaline potassium hydroxide aqueous solution.

*Example III*

Example I was repeated in all details except that in this instance the active paste contained sulfur in 25 weight percent potassium hydroxide aqueous solution. The cell produced a 0.4 volt and 8 milliamperes within the external circuit.

By recharging the cell at a potential of 4 volts, the cell produced was capable of generating a 250 milliampere current within the external circuit. The voltage was 2.35.

The following examples repeat the above demonstrations employing various other sulfur type depolarizing materials.

*Example IV*

All of the foregoing examples are repeated as in the foregoing except that in these instances the following sulfur depolarizer materials are employed; saturated aqueous sodium polysulfide, hydrogen pentasulfide, sodium pyrosulfate, sulfur hexafluoride, sulfuryl chloride, sulfur monobromide, pyrosulfuryl chloride and thiocyanic acid. The energy of the reactions produced forms cells having highly satisfactory voltage and current characteristics.

The following two examples describe the use of sulfur type depolarizing materials at different oxidation states prior to their use within a battery.

*Example V*

A cell was formed as in the foregoing examples except that in this instance a saturated aqueous solution of sodium hydrosulfite was charged into one electrode compartment and a saturated aqueous solution of sodium sulfite in the other. A 0.3 volt cell was produced and a 0.43 milliampere current flowed in the external circuit.

*Example VI*

The foregoing example is repeated except that saturated aqueous sodium sulfide and sodium sulfite solutions respectively are charged into the electrode compartments. A satisfactory cell is thereby formed.

Although the present invention has been disclosed in connection with a few preferred embodiments thereof, a great number of variations and modifications can be made without departing from the spirit and scope thereof. For example, other electrode materials may be employed quite successfully, viz., the transition metals and such other metals as lead, tin and aluminum. Of this class of materials the preferred metals are those capable of forming refractory oxides, for example, titanium, tungsten, etc.; also the noble metals platinum, silver, gold, etc.; and those metals capable of forming insoluble sulfides, viz., iron, nickel, copper, etc. The metals may be used alone or as alloys and also can be used to blend with carbon or graphite. Certain conductive plastics can also be used satisfactorily.

The electrolyte, or depolarizer, can be sulfur or an inorganic sulfur compound capable of assuming greater than one oxidized form dissolved in an aqueous solution. To form a "dry cell" other materials can be added thereto, for example, finely divided wood flour or other cellulose material, plastic, asbestos, etc. Such materials can also be coated with conducting material to extend the effective area of the electrodes in the manner already described. Thus, fibrous material such as cellulose, cotton, etc., can be coated with metals such as aluminum, gold, electrically conducting printing ink, etc., to extend the effective area of the electrodes.

With regard to the concentrations of the inorganic sulfur depolarizing agents in aqueous solution, a saturated solution is preferred through this is not critical. Very dilute solutions down to a small fraction of 1 percent can also be satisfactorily employed. Other substances can be also dissolved therein though this is unnecessary except in the case where the solution is made alkaline to dissolve sulfur.

Methods for the preparation of the inorganic sulfur depolarizing agents are well known and described throughout the literature.

Having described the invention, what is claimed is:

1. In a method of preparing a battery, the steps of providing an anolyte and a catholyte in separate compartments that are electrolytically connected together by means of a diaphragm, said anolyte and catholyte each consisting essentially of a saturated aqueous solution of sodium thiosulfate, providing in each compartment an electrode in contact with the electrolyte and electrolytically inert thereto, and electrolyzing the combination until the assembly develops a battery potential between its electrodes.

2. In a method of preparing a battery, the steps of providing an anolyte and a catholyte in separate compartments that are electrolytically connected together by means of a diaphragm, said anolyte and catholyte each consisting essentially of a mixture of sulfur with a strong aqueous solution of potassium hydroxide, providing in each compartment an electrode in contact with the electrolyte and electrolytically inert thereto, and electrolyzing the combination until the assembly develops a battery potential between its electrodes.

3. In a method of preparing a battery, the steps of providing an anolyte and a catholyte in separate compartments that are electrolytically connected together by means of a diaphragm, said anolyte and catholyte each consisting essentially of a saturated aqueous solution of sodium polysulfide, providing in each compartment an electrode in contact with the electrolyte and electrolytically inert thereto, and electrolyzing the combination until the assembly develops a battery potential between its electrodes.

4. A battery having two separate electrolyte compartments electrolytically connected together by means of a diaphragm, the electrolyte in one compartment being essentially a saturated aqueous solution of sodium hydrosulfite and the electrolyte in the other compartment being essentially a saturated aqueous solution of sodium sulfite, each compartment having an electrode in contact with the electrolyte and electrolytically inert thereto.

5. A battery having two separate electrolyte compartments electrolytically connected together by means of a diaphragm, the electrolyte in one compartment being essentially a saturated aqueous solution of sodium sulfide and the electrolyte in the other compartment being essentially a saturated aqueous solution of sodium sulfite, each compartment having an electrode in contact with the electrolyte and electrolytically inert thereto.

References Cited in the file of this patent

UNITED STATES PATENTS

| | | |
|---|---|---|
| 895,715 | Basset | Aug. 11, 1908 |
| 1,011,485 | Pfleiderer | Dec. 12, 1911 |
| 1,323,879 | Libby | Dec. 2, 1919 |
| 1,771,190 | Polcich | July 22, 1930 |
| 2,534,403 | Blake et al. | Dec. 19, 1950 |
| 2,698,876 | Lehovec | Sept. 21, 1954 |
| 2,814,664 | Ruben | Nov. 26, 1957 |
| 2,831,045 | Harding | Apr. 15, 1958 |

FOREIGN PATENTS

| | | |
|---|---|---|
| 12,172 | Great Britain | July 15, 1899 |
| 112 | Great Britain | Dec. 2, 1915 |

OTHER REFERENCES

Trans. Electrochem. Society, volume 41, 1922, McKay, Corrosion by Electrolyte Concentration Cells, page 207.